: 3,455,815
Patented July 15, 1969

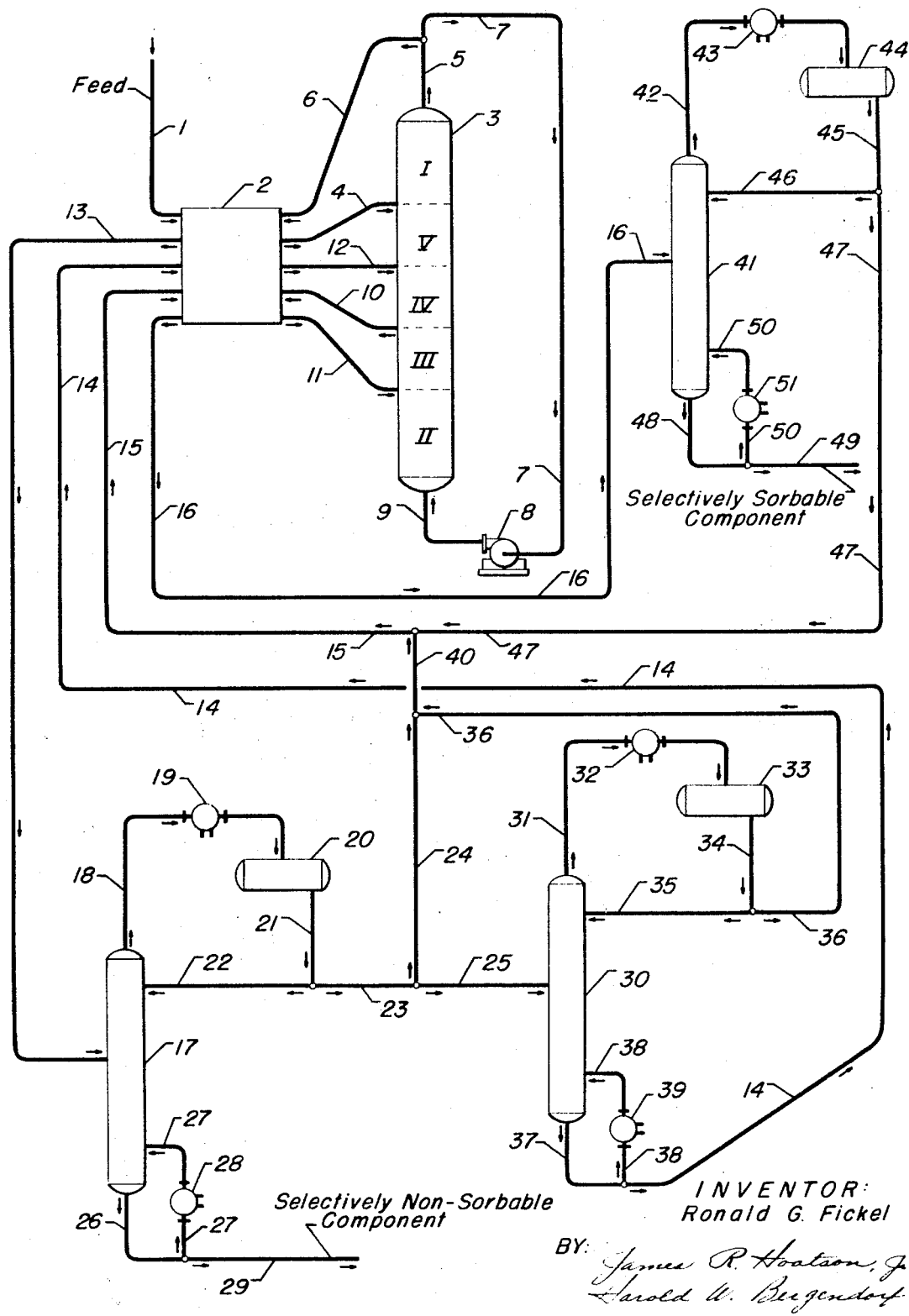

3,455,815
SORPTION PROCESS
Ronald G. Fickel, Hoffman Estates, Ill., assignor to Universal Oil Products Company, Des Plaines, Ill., a corporation of Delaware
Filed July 13, 1967, Ser. No. 653,098
Int. Cl. C10g 25/00
U.S. Cl. 208—310                                          11 Claims

ABSTRACT OF THE DISCLOSURE

Process for separating selective component from non-selective component of a feed over a bed of solid sorbent particles, using a desorbent of different boiling point range than feed having a selective component to displace feed selective component from sorbent, and a non-selective component, a portion of which is used to wash feed non-selective component from interstitial void spaces between sorbent particles in the sorbent bed after the bed has been contacted with feed and before the feed selective component is desorbed. The selective component and the non-selective component of the desorbent are of a different boiling point range to render them readily separable from each other.

---

This invention relates to a process for the separation of components of a fluid mixture. More particularly, this invention relates to a process for the separation of components of a fluid mixture, at least one of which is selectively sorbable by contact with a bed of solid sorbent particles, in which a desorbing fluid containing selectively sorbable component and non-selectively sorbable component is employed to desorb the selectively sorbable component of the fluid mixture from the sorbent. Still more specifically, this invention relates to the recovery of a stream consisting essentially of non-selectively sorbable component of the desorbing fluid and using said stream to displace non-selectively sorbable component of the fluid mixture after the bed has been contacted with fluid mixture and before the fluid mixture selective component is desorbed.

In one of its embodiments, this invention relates to a process for the separation of components of a fluid mixture, at least one of which is selectively sorbable by contact with a solid sorbent, in which a desorbing fluid containing a selectively sorbable component and a non-selectively sorbable component is employed which comprises: introducing the fluid mixture into contact with a bed of solid sorbent; withdrawing from said bed a raffinate mixture comprising non-selectively sorbable component of the fluid mixture, selectively sorbable component of the desorbing fluid and non-selectively sorbable component of the desorbing fluid; separating the raffinate mixture into a fraction comprising non-selectively sorbable component of the fluid mixture, a fraction comprising selectively sorbable desorbing fluid component and a fraction consisting essentially of non-selectively sorbable desorbing fluid component; returning the fraction comprising selectively sorbable desorbing fluid component to the sorbent bed; separately returning the fraction consisting essentially of non-selectively sorbable desorbing fluid component to the sorbent bed; withdrawing from said bed a sorbate mixture comprising selectively sorbable component of the fluid mixture, selectively sorbable component of the desorbing fluid and non-selectively sorbable component of the desorbing fluid separating the sorbate mixture into a fraction comprising selectively sorbable component of the fluid mixture and a portion comprising selectively sorbable and non-selectively sorbable components of desorbing fluid; returning the portion comprising selectively sorbable and non-selectively sorbable components of the desorbing fluid to the sorbent bed; and separately recovering the selectively sorbable component of the fluid mixture and the non-selectively sorbable component of the fluid mixture.

In another of its embodiments, this invention relates to a process for the separation of components of a fluid mixture, at least one of which is selectively sorbed by contact with a solid sorbent, in which a desorbing fluid containing a selectively sorbable component and a non-selectively sorbable component is employed which comprises: introducing the fluid mixture into a first zone of a fixed bed of the solid sorbent containing at least five serially interconnected zones having fluid flow connecting means between adjacent zones and between the outlet of one terminal zone and the inlet of the other terminal zone in the series to thereby provide cyclic fluid flow in said process; substantially simultaneously withdrawing a raffinate mixture from a second zone immediately downstream of said first zone; separating the raffinate mixture into a first fraction comprising non-selectively sorbable component of the fluid mixture, a second fraction comprising selectively sorbable component of the desorbing fluid and a third fraction consisting essentially of non-selectively sorbable component of the desorbing fluid; returning the second fraction comprising selectively sorbable component of the desorbing fluid to said fixed bed by substantially simultaneously introducing said second fraction into a third zone immediately downstream of said second zone; substantially simultaneously withdrawing a sorbate mixture from a fourth zone immediately downstream of said third zone; separating the sorbate mixture into a fourth fraction comprising selectively sorbable component of the fluid mixture and a fifth fraction comprising selectively sorbable component and non-selectively sorbable component of the desorbing fluid; returning the fifth fraction to the fixed bed by substantially simultaneously introducing said fifth fraction into the third zone as additional desorbing fluid; returning the third fraction to the fixed bed by substantially simultaneously introducing said third fraction into a fifth zone immediately downstream of the fourth zone; maintaining a continuously circulating stream of fluid flowing through the series of interconnected zones; and periodically advancing downstream the point in said fixed bed of introducing said fluid mixture while simultaneously and equally advancing downstream the point of introducing desorbing fluid and third fraction and of withdrawing raffinate and sorbate.

Another embodiment includes commingling the desorbing fluid from the raffinate mixture and the sorbate mixture and separating the commingled product to recover a stream consisting essentially of non-selectively sorbable component of the desorbing fluid and returning said non-selectively sorbable component as a separate stream to the fixed bed of sorbent to wash non-selectively sorbable component of the fluid mixture from the bed prior to desorbing the selectively sorbable component of the fluid mixture from the sorbent. Still another embodiment is contemplated wherein the stream consisting essentially of non-selectively sorbable component of the desorbing fluid is recovered from the sorbate mixture before being returned to the bed of sorbent. The stream consisting essentially of non-selectively sorbable component may also be recovered from either the raffinate fractionator or the sorbate fractionator as a side cut fraction therefrom.

It is an object of the present invention to reduce the desorption of selectively sorbable component of the fluid mixture when washing non-selectively sorbable component of the fluid mixture from interstitial void space between sorbant particles.

It is another object of the present invention to reduce the quantity of sorbent required to achieve the desired separation in a sorption process.

It is still another object of the present invention to enhance the purity of the selectively sorbable component of the fluid mixture without reducing its recovery from the fluid mixture in a separation process.

The present invention is applicable to any solid sorption separation process wherein a feed having a selectively sorbable component and a non-selectively sorbable component is employed wherein a desorbing fluid is utilized to desorb the selectively sorbable component of the fluid mixture and contains both a selectively sorbable component and a non-selectively sorbable component which components are separatable. It is now widely recognized that various solid sorbents of specific composition and structure may be contacted with a mixture of compounds of a fluid mixture, the compounds of which differ in their relative sorbency on the sorbent to thereby provide a means for segregating the individual components according to their structure. This type of separation procedure has been applied to mixtures of inorganic as well as organic compounds and has found one of its most frequent applications in the field of separating hydrocarbon mixtures containing components which differ as to their structural class, being particularly applicable to the separation of mixtures which are relatively difficult to separate by other means of separation. One type of solid sorbent generally characterized as having adsorptive properties selectively absorbs that component of a mixture of organic compounds which has the highest relative degree of polarity, the adsorptive capacity and retentivity of the adsorbent for the sorbate component of the feed stock depending upon the availability of the large superficial area on or in the adsorbent particles, the presence of a polar radical or an unsaturated bond within the structure of the component selectively adsorbed (sorbate), and the lack of such polar groups or points of unsaturation within the structure of the feed stock components less sorbed by the solid adsorbent. Adsorbents of this size are typified for example by such solids as silica gel (dehydrated), activated charcoal, the aluminosilicates such as the crystalline aluminosilicates (Type A, Type X, Type Y), various clays and activated silica gels including such typical examples as attapulgus clays, montmorillonite, dehydrated, synthetically prepared composites of aluminum and silica, activated alumina as well as other materials of similar character which adsorb such polar or unsaturated compounds by virtue of electrostatic attraction for the component of the feed stock mixture containing the polar or unsaturated groups which retain a layer of sorbate component on the surface of the sorbent. Another type of separation employing a solid sorbent utilizes solid particles of a porous sorbent which selectively occludes into the polar structure of the sorbent a straight chain component of the feed stock but which does not permit entry into the pores of the sorbent of branched chain components of the feed stock. The pores of this type of adsorbent are generally of about 5 angstroms in cross sectional diameter at the pore entrance and the sorbent belongs to a type of material characterized as a dehydrated metal aluminosilicate, the metallo constituent of which generally contains an alkaline earth metal. A preferable adsorbent of this type comprises the calcium form of Type A crystalline aluminosilicate such as described in U.S. Patent No. 2,882,243 issued Apr. 14, 1959. The pore entrances of the calcium form of Type A are about 5 angstroms in cross sectional diameter which permits the entry of straight chain compounds such as normal hexane into the pore structure while excluding from said pore structure non-normal compounds such as 2,3-dimethylbutane, cyclohexane and benzene. In order to provide a useful method for separation of straight chain from non-straight chain components, it is necessary to desorb and recover the occluded straight chain compounds in high purity. This can be accomplished by means of other straight chain components preferably from a different molecular weight than the occluded normal compounds. A system may be envisioned for example whereby a feed mixture of 2,3-dimethyl butane, cyclohexane and normal hexane is contacted with a sorbent selective for normal hexane (this mixture is difficult to separate by fractional distillation). It will be found that when the non-sorbed effluent or raffinate is withdrawn from the bed of sorbent, it will be enriched in concentration of 2,3-dimethyl butane and cyclohexane. The sorbent now saturated with normal hexane is contacted with a desorbing fluid such as normal butane and isopentane whereby a portion of the normal butane displaces the normal hexane leaving the liquid surrounding said sorbent enriched in normal hexane and isopentane. Said liquid is withdrawn from the solid sorbent and thereupon more of said feed mixture is introduced into contact with the sorbent now saturated with normal butane. The normal hexane displaces the normal butane from the pores thereby leaving a liquid surrounding said sorbent enriched in normal butane, cyclohexane and 2,3-dimethyl butane. This latter liquid was previously described as raffinate and is withdrawn from the solid sorbent. This principal of separation may be properly multistaged to give a continuous separation process and is described further hereafter. It has been found desirable that in multistaging operations, the desorbing fluid should contain selectively sorbable component (straight chain hydrocarbons) and nonselectively sorbable component (non-straight chain hydrocarbons) since in order to achieve high purity straight chain feed components, the interstitial space outside of the solid sorbent must be washed free of feed non-straight chain components prior to desorption. If the desorbing fluid were composed of only selectively sorbable component, then in addition to washing of the void space, there would also occur extensive desorption of the straight chain feed components. These desorbed straight chain feed components either must be re-sorbed or else lost out with the raffinate and thus represent a loss in recovery of high purity selectively sorbable feed component. By also using a non-selectively sorbable component in the desorbing fluid, desorption of the feed selectively sorbable component during the washing is reduced. It was recognized, however, that as the concentration of non-selectively component in the desorbing fluid increased, more desorbing fluid has to be circulated to attain complete desorption of the feed selectively sorbable component thus increasing the operating cost. The past solution has been an economic balance between the above extremities.

When using a feed stock which is heavier than the desorbing fluid, it has been found desirable to utilize a desorbing fluid wherein the selectively sorbable component thereof is of different boiling range than the non-selectively sorbable component. For example, if the feed stock contains a mixture of iso and normal $C_{12}$'s, it is preferable to use a desorbing fluid having normal $C_5$'s and iso-$C_8$'s as the desorbing fluid. The lighter normal $C_5$ will be effective in increasing the rate of desorption of normal $C_{12}$ from the sorbent while the iso-$C_8$'s in admixture with the normal $C_5$ as the desorbing fluid will maintain itself in the liquid phase at higher temperatures and equal pressure than could be achieved with a pure $C_5$ desorbing fluid. Therefore, the use of a desorbing liquid having non-selectively sorbable component of a different boiling range than selectively sorbable component is frequently encountered.

The present invention relates to an improved process wherein this situation occurs such that a stream consisting essentially of non-selectively sorbable component of the desorbing fluid may be readily obtained and utilized to wash the non-selectively sorbable component of the feed stock from the solid sorbent.

The separation of straight chain hydrocarbons from hydrocarbon mixtures using zeolitic molecular sieves has been known for a number of years. For example, a process for the separation of normal paraffins using molecular sieves is shown in U.S. Patent No. 2,920,037 issued on June 5, 1960. Another example is shown in U.S. Patent No. 2,957,927 issued Oct. 25, 1960. Some of these processes utilize a swing bed system wherein one bed is maintained on an adsorption cycle and one bed on a desorption cycle. Other processes use the concept of simulated countercurrent flow by moving the points of inlet and outlet of feed of streams into and out of the bed using sorbents such as molecular sieves. For example, such a process is shown in U.S. Patent No. 2,985,589 issued on May 23, 1961. The present invention is especially applicable to this simulated countercurrent flow continuous process.

The accompanying drawing shows a preferable embodiment of the present invention. One of the essential parts of the process is sorbent contacting chamber 3 shown in the attached drawing. Said chamber is capable of having introduced into it continuously a feed mixture, a washing liquid consisting esesntially of non-selectively sorbable component of the desorbing fluid and a desorbing fluid while simultaneously having withdrawn a relatively less sorbed raffinate and a selectively sorbed sorbate. Sorbent contacting chamber 3 represents any suitable apparatus comprising a series of fixed beds or if desired one single continuous bed of sorbent having fluid flow connecting means between the outlet of one bed and the inlet of its next adjacent bed and comprising suitable means such as a valve or manifold for shifting the points of inlet and outlet for various feed and product streams involved in the process. The series of fixed beds may be a number (at least five) of horizontally spaced separate beds interconnected by a pipe from the bottom of one bed and the top of its upstream adjacent bed, or the beds may be stacked one upon another within a suitable vertical column. The vertical column herein referred to in its entirety as contacting chamber 3 containing suitably shaped partitioning means which divide the vertical column into a series of adjacent contacting beds is utilized to obtain a simulated countercurrent flow of solid sorbent and liquid feed.

An essential portion of this part of the process, that is, essential to the realization of simulated countercurrent flow of solid and liquid, is the provision of a suitable programing device for changing the point of inlet and outlet into and out from the contacting chamber, and for advancing each of these points in the downstream direction during operation of this part of the process. Any suitable form of fluid distribution center such as a manifold arrangement of valve with incoming and outgoing lines may be provided with timed electrically operated switches to open and close appropriate valves. A programing principal may also be suitably effective by means of a plug valve particularly designed such as that rotary valve described and claimed in U.S. Patent No. 3,040,777 issued June 26, 1962.

In the drawing, valve 2 represents such a rotary valve and contains a number of fluid inlet and outlet ports (conduits 4, 6, 10, 11 and 12) which are connected to the contacting beds in chamber 3. The sorbent contacting chamber 3 may also be visualized as being a series of at least five interconnected zones of a single fixed bed of solid sorbent having no actual line of demarcation between each zone other than the zone boundaries defined by the points of inlet and withdrawal of the various fluid streams. All these zones are defined from the points of inlet and withdrawal and thus the zones will shift as the rotary valve rotates even though physically the bed of sorbent will remain fixed. Each zone may contain a number of contacting beds and there would be a conduit connected from each bed to rotary valve 2. The details of the simulated countercurrent flow contacting apparatus is described in greater detail in patents such as U.S. Patent Nos. 2,985,589, 3,291,726 and 3,310,486. The flow scheme hereinafter described will show the material flowing in the various conduits when the rotary valve is in one position. However, it should be realized that as the rotary valve rotates, the inlet and outlet stream from the contacting chamber will be shifted to different points within chamber 3. Feed stock containing a selectively sorbable component and a non-selectively sorbable component is introduced into conduit 1 where it flows through rotary valve 2 through conduit 4 and into the upstream point of zone I in contacting chamber 3. As a result of the sorption, the selectively non-sorbable components of the feed congregate in the interstitial void spaces and are withdrawn from the top of chamber 3 as raffinate through conduit 5 where a portion flows through conduit 6, rotary valve 2 and out flow conduit 13. The remaining portion of raffinate flows through conduit 7 through circulating pump 8 through conduit 9 and into the upstream point of zone II to complete a continuous cycle. Desorbing fluid from a source hereinafter defined flows through conduit 15 through rotary valve 2 through conduit 11 and into the upstream point of zone III wherein the selectively sorbable component of the desorbing fluid displaces the selectively sorbed component of the feed mixture. As a result of the desorption, the selectively sorbable component of the feed is displaced from the solid sorbent and congregates in the interstitial void spaces between the sorbent particles whereupon it is withdrawn from the upstream point of zone IV through conduit 10. This material, called the sorbate, flows through rotary valve 2 and out conduit 16. A wash liquid flowing in flow conduit 14 from a source described hereinafter flows through rotary valve 2 through conduit 12 and into the upstream point of zone V wherein the material washes non-selectively sorbable component of the feed from the interstitial void space between sorbent particles in zone V previously described as raffinate. Raffinate flowing conduit 13 is introduced into raffinate fractionator 17. In this illustration, it is assumed that the desorbing fluid is of lighter molecular weight and has a lower boiling point than the feed stock although the reverse would also be feasible. The fractionator 17 is operated to split between the lighter desorbing fluid components and the heavier feed components. The lighter material is withdrawn as a vapor through conduit 18 where it is condensed in cooler 19 and is introduced into receiver 20. The condensed liquid is withdrawn from receiver 20 through conduit 21 where a portion thereof is recycled for reflux through conduit 22. The remaining net overhead material is withdrawn through conduit 23. Feed stock non-selectively sorbable component congregates in the bottom of fractionator 17 and is withdrawn through conduit 26 where a portion thereof flows through conduit 27 and reboiler 28 returning to column 17 to supply the heat energy to separate the lighter components therefrom. The net non-selectively sorbable feed component raffinate stream is withdrawn through flow conduit 29 and recovered as one of the products of the process. The lighter overhead material flowing in conduit 23 may be entirely recycled to the sorbent contacting chamber as a portion of the desorbing fluid through conduit 24, a portion thereof may be recycled to the sorbent contacting chamber as a part of the desorbing fluid through conduit 24 or the entire overhead material may be introduced through conduit 25 where it flows into fractionator 30. Fractionator 30 is operated to separate the non-selectively sorbable component of the desorbing fluid from the selectively sorbable component of the desorbing fluid. It is assumed for purposes of this illustration that the selectively sorbable component of the desorbing fluid is of lower boiling point than the non-selectively sorbable component thereof. Fractionator 30 is operated to drive a vapor portion overhead therefrom through conduit 31 which is condensed in cooler 32 and flows into receiver 33. The condensed liquid is withdrawn from receiver 33 through conduit 34 where a portion thereof flows through conduit 35 returning to fractionator 30 as reflux. The net overhead product from fractionator 30 is withdrawn through conduit 36 and comprises selectively sorbable component of the desorbing fluid. This material flows to conduit 36 where it joins any material flowing in conduit 24 (overhead material from fractionator 17 which has not been sent to fractionator 30) and the resulting mixture flows into conduit 40. The bottom stream from fractionator 30 is withdrawn through conduit 37 where a portion thereof flows through conduit 38, reboiler heater 39 and back into fractionator 30 to supply the heat to make the required separation. The net bottoms material from fractionator 30 is withdrawn through conduit 14 and consists essentially of non-selectively sorbable component of the desorbing fluid. This material is directly reintroduced into contacting chamber 3 via rotary valve 2 and conduit 12 to wash the interstitial void space free of non-selectively sorbable component of the feed stock in zone V of chamber 3. Sorbate stream comprising selectively sorbable component of the feed stock is withdrawn from conduit 16 into fractionator 41. Fractionator 41 is operated to separate the desorbing fluid component from the feed stock component. An overhead stream is withdrawn from fractionator 41 through conduit 42 where the vapor passes through cooler 43 and is condensed therein. The condensed liquid flows through conduit 42 into receiver 44. The condensed liquid is withdrawn from receiver 44 through conduit 45 and a portion thereof flows through conduit 46 returning to fractionator 41 as reflux. The net overhead liquid from fractionator 41 is withdrawn through conduit 47 and comprises desorbing fluid (both selectively sorbable and non-selectively sorbable components). The material flowing in conduit 47 is mixed with the desorbing fluid flowing in conduit 40 to produce the total desorbing fluid to contacting chamber 3 flowing in conduit 15. This material is returned to contacting chamber 3 via rotary valve 2 and conduit 11 to desorb the selectively sorbable component of the feed stock from the sorbent in zone III. The bottoms material from the fractionator 41 is withdrawn through conduit 48 where a portion thereof flows through conduit 50, reboiler heater 51 and is returned to fractionator 41 to supply the heat energy to make the required separations therein. The net bottoms stream is withdrawn through conduit 49 and comprises selectively sorbable component of the feed stock which is recovered as a product of the process.

It should be recognized that the flow as depicted in contacting chamber 3 is upflow through the bed of sorbent and thus zone II is immediately upstream of zone III, zone V is immediately upstream of zone I, etc. When rotary valve 2 rotates, the points of introduction and withdrawal from contacting chamber 3 will be shifted in a downstream direction. Thus, after the rotary valve has shifted a number of beds, the zones will be shifted downstream but will still be located in the same position with respect to the other zones. This has the effect of simulating movement of the solid sorbent and thus creates a simulated countercurrent contacting of solid sorbent and fluid mixtures. It should also be recognized that there may not be necessarily an equal number of beds in each zone. The continual shifting of rotary valve 2 will accomplish the desired simulated countercurrent flow. Usually rotary valve 2 is programed by shifting downstream one bed after a preselected period of time. The purpose of the circulation pump 8 and its associated flow conduit 7 and 9 is to connect the one terminal zone (zone I as shown in the drawing) with the other terminal zone (zone II as shown in the drawing).

One of the novel features of the presnte invention resides in the use of a stream consisting essentially of non-selectively sorbable component of the desorbing fluid to flush non-selectively sorbable of the feed stream from the interstitial void spaces between the sorbent particles in zone V. This particular wash stream will prevent the undesired desorption of selectively sorbable components of the feed stock in zone V. Because of this, the quantity of sorbent required is less than when there is desorption of feed components by desorbent within zone V due to the presence of selectively sorbable components therein. Also, the purity of the extract product (material flowing in conduit 49) will be enhanced without the normal corresponding reduction of recovery of selectively sorbable components.

The sorbent contacting chamber is operated at conditions of temperature, pressure and other process conditions which depend on the particular feed stock involved, the particular sorbent utilized and the required purity of product. Although, this chamber may be operated in either the liquid or vapor phase, in many cases it is preferable to operate in the liquid phase. Typical liquid phase operation is, for example, temperatures of from about 30° F. to about 600° F. and more particularly from about 250° F. to about 500° F. and pressures of from slightly super atmospheric to 30 atmospheres or higher depending primarily on the feed stock and desorbent. Generally higher pressures would be employed for low molecular weight feed stocks to maintain liquid phase in the contacting chambers. When the desorbing fluid is of lighter molecular weight, (lower boiling points) than the feed stock, the boiling point range of the desorbing fluid generally fixes the pressure required to maintain liquid phase. In many cases it is desirable to operate at conditions which will maintain the inlet and outlet fluids from the contacting chamber in the liquid phase but will maintain relatively lower viscosity to avoid excess pressure drop in the packed beds of sorbent as well as to permit a more rapid rate of sorption and desorption. It is within the scope of the invention to utilize different temperatures in different zones of the fixed beds to take advantage of the rate of sorption and desorption due to the differences in property of the feed stock and the desorbing fluid. This may be accomplished, for example, by heating one of the inlet streams or heating both but to different temperatures prior to entering the contacting chamber.

Suitable feed stocks will include any fluid mixture which contains one component which is capable of being selectively sorbed by the sorbent. A particularly suitable feed stock would be an organic liquid containing component which is selectively sorbed by a sorbent. A hydrocarbon fluid mixture containing at least one straight chain component would be an especially preferable feed stock. Specific examples of hydrocarbon mixtures would be a gasoline boiling range naphtha, a kerosene, a distillate fuel and a lubricating oil. This process may be employed to upgrade the octane number of naphthas by selectively removing the low octane straight chain components from the fluid mixture thus producing a fuel of enhanced octane number (raffinate). This process can produce a concentrate of straight chain components either of narrow or broad molecular weight range which is useful as an intermediate in ultimately producing desirable products such as biodegradable detergents having a linear side chain in the alkylbenzene sulfonate detergents. Straight chain components also make efficient jet fuels. In the lubricating oil boiling range a concentrate of normal components is useful as a multi-viscosity lubricating oil. In this latter example, it becomes unnecessary to add synthetic organic compounds to lubricating oils in order to achieve the desired multi-viscosity specification. The synthetic organic compounds are undesirable in that they substantially add to the cost of the lubricating oil and are frequently unstable.

The maximum charge rate of feed stock through the fixed bed of solid sorbent is limited by the tolerable pressure drop through said fixed bed. The minimum charge stock through the fixed bed is limited to a rate sufficient to avoid back mixing (i.e. to maintain substantially plug flow through said beds). These rates will be dependent upon the type of charge stock used and the conditions of pressure and temperature employed in the operation of the sorbent contacting chamber. It is convenient to use the concept of space velocity in defining the ratio of feed stock charge rate to quantity of sorbent. The term liquid hourly space velocity will be used herein and is defined as the charge rate of feed stock at conditions of 60° F. and one atmosphere in cubic feet per hour divided by the cubic feet of solid sorbent. It is expected that liquid hourly space velocities of from about 0.01 to about 1.0 will be employed depending upon the operating conditions of pressure, temperature, feed stock and equipment limitations.

Suitable particles would be any substance which can be produced in discrete particles within the size range of from about 10 to about 200 mesh and which have an appreciable degree of selectivity for at least one of the components of the fluid feed mixture to be separated. In the case of separating straight chain components from a mixture of straight chain and non-straight chain hydrocarbons, dehydrated metal aluminosilicates having pore entrance openings of about 5 Angstroms comprise a suitable sorbent. The metal aluminosilicates have been commonly called molecular sieves. This material includes both synthetic and natural occurring zeolites and is made of crystalline structure having many small cavities contacted by still smaller pore entrances of uniform size. These pores may vary in size of from about 3 Angstrom units up to about 12 or 15 or even more. However, a particular molecular sieve material will have uniform pore sizes. Zeolites vary somewhat in composition although they generally contain aluminum, silicon, oxygen and alkali or alkaline earth metal. To separate straight chain components, the pore size should be about 5 Angstroms. A suitable molecular sieve for this purpose is the calcium form of Type A molecular sieve. To separate olefins from paraffins a crystalline aluminosilicate such as faujasite either in the alkali metal form or in an ion-exchange form such as the silver form may be satisfactorily employed. In still other instances, other size molecular sieve pores may be employed in different types of separations. Other sorbents which may be useful in this process may be selected from such materials as activated carbon, activated alumina, silica gel, adsorbent cotton, glass wool, various clays, Fullers earth, bone char, metal oxides, etc. depending on the desired separation.

Conventional processing equipment such as control valves, heat exchangers, heaters, coolers, instrumentation, etc., are not shown in the drawing since the selection of this equipment is within the skill of a process engineer and adds little to the inventive concept of the present process. Such equipment must, of course, be included in the process in order that it may function as hereinbefore described.

The following example is presented to further illustrate the process of this invention and not to limit the scope of the invention to those reactants and conditions specifically shown therein.

EXAMPLE

This example is presented to illustrate the separation and recovery of straight chain paraffins from a kerosene feed to be used as the side chain in a biodegradable alkyl aryl detergent. Equipment is arranged substantially as shown in the drawing attached hereto except that a portion of the overhead from fractionator 41 is introduced as a part of the feed to fractionator 30. A hydrotreated kerosene is introduced into conduit 1 at a rate of about 91,000 pounds per hour. This feed contains about 18 wt. percent straight chain paraffins and has an API gravity of 43.5 and an Engler Distillation Initial boiling point, 50% point and end point of 354° F., 418° F. and 489° F. respectively. The desorbing fluid consists essentially of normal pentane and an isooctane rich mixture prepared from alkylate in a sulfuric acid motor fuel alkylation unit. Sufficient amounts of each desorbing fluid component are placed in the plant inventory to result in 60 volume percent normal pentane and 40 volume percent isooctane. Desorbing fluid flows through conduit 15 at a rate of about 89,230 pounds per hour.

A stream consisting essentially of the isooctane mixture from the bottom of fractionator 30 flows through conduit 14 at a rate of about 40,120 pounds per hour.

A raffinate stream is withdrawn from chamber 3 through conduit 13 at a rate of about 130,480 pounds per hour whereupon it is introduced in fractionator 17. A condensed net overhead stream is withdrawn from receiver 20 through conduit 23 at a rate of 56,780 pounds per hour and comprises normal pentane and isooctane. This entire net overhead stream flows into fractionator 30 through conduit 25. A non-selectively sorbable component of the feed is withdrawn from the bottom of fractionator 17 through conduit 29 at a rate of 73,700 pounds per hour.

Fractionator 17 net overhead at a rate of 56,780 pounds per hour and a portion of fractionator 41 net overhead at a rate of 11,650 pounds per hour is introduced into fractionator 30 through conduit 25. A net overhead fraction comprising normal pentane and isooctane is withdrawn from receiver 33 through conduit 36 at a rate of 28,310 pounds per hour. A net bottoms stream consisting essentially of isooctane is withdrawn from fractionator 30 through conduit 14 at a rate of 40,120 pounds per hour.

A sorbate stream is withdrawn from chamber 3 through conduit 16 at a rate of 89,870 pounds per hour whereupon it is introduced into fractionator 41. A condensed net overhead stream comprising normal pentane and isooctane is withdrawn from receiver 44 through conduit 47 at a rate of 72,570 pounds per hour and is divided into two fractions. A first fraction is introduced into fractionator 30 described hereinabove at a rate of 11,650 pounds per hour. The second fraction is returned to chamber 3 through conduit 15 at a rate of 60,920 pounds per hour as a portion of the desorbing fluid flowing in conduit 15. Said second fraction is commingled with the overhead from fractionator 30 flowing in conduit 36 to produce a total desorbing fluid comprising normal pentane and isooctane flowing through conduit 15 at a rate of 89,230 pounds per hour. A selectively sorbable component of the feed is withdrawn from the bottom of fractionator 41 through conduit 49 at a rate of 17,300 pounds per hour.

As a result of the above processing, it is estimated that about 95 volume percent of the straight chain paraffins in the feed are recovered in the product from conduit 49 and that the purity of this recovered stream is about 99 weight percent. It is expected that without the use of fractionator 30 and the washing of the sieves with the stream consisting essentially of non-selectively sorbable desorbing fluid component, it would require about 30% additional sieves to obtain the above recovery and purity. It is also estimated that utilities will significantly decrease and the amount of circulation of desorbing fluid will be reduced by as much as 30 to 40%.

I claim as my invention:
1. A process for the separation of components of a fluid mixture, at least one of which is selectively sorbed by contact with a solid sorbent in which a desorbing fluid containing a selectively sorbable component and a non-selectively sorbable component is employed which comprises:

introducing the fluid mixture into contact with a bed of solid sorbent; washing the bed with a wash fluid predominating in the non-selectively sorbable component of the desorbing fluid and withdrawing from said bed a raffinate mixture comprising non-selectively sorbable component of the fluid mixture, selectively sorbable component of the desorbing fluid and non-selectively sorbable component of the desorbing fluid;

separating the raffinate mixture into a fraction comprising non-selectively sorbable component of the fluid mixture, a fraction comprising selectively sorbable desorbing fluid component and a fraction consisting essentially of non-selectievly sorbable desorbing fluid component;

returning the fraction comprising selectively sorbable desorbing fluid component to the sorbent bed;

separately returning the fraction consisting essentially of non-selectively sorbable desorbing fluid component to the sorbent bed;

treating the washed bed with the desorbing fluid and withdrawing from said bed a sorbate mixture comprising selectively sorbable component of the fluid mixture, selectively sorbable component of the desorbing fluid and non-selectively sorbable component of the desorbing fluid;

separating the sorbate mixture into a fraction comprising selectively sorbable component of the fluid mixture and a portion comprising selectively sorbable and non-selectively sorbable components of desorbing fluid;

returning the portion comprising selectively sorbable and non-selectively sorbable components of the desorbing fluid to the sorbent bed; and separately recovering the selectively sorbable component of the fluid mixture and the non-selectively sorbable component of the fluid mixture.

2. The process of claim 1 further characterized in that the sorbent comprises crystalline aluminosilicate, the fluid mixture comprises a hydrocarbonaceous fluid and the process if carried out in the liquid phase.

3. The process of claim 2 further characterized in that the selectively sorbable components of the fluid mixture and the desorbing fluid comprise straight chain aliphatic hydrocarbons.

4. The process of claim 3 further characterized in that the crystalline aluminosilicate has pore entrance openings of about 5 Angstroms and the selectively sorbable components of the fluid mixture and desorbing fluid are normal paraffins.

5. A process for the separation of components of a fluid mixture, at least one of which is selectively sorbed by contact with a solid sorbent in which a desorbing fluid containing a selectively sorbable component and a non-selectively sorbable component is employed which comprises:

introducing the fluid mixture into a first zone of a fixed bed of the solid sorbent containing at least five serially interconnected zones having fluid flow connecting means between adjacent zones and between the outlet of one terminal zone and the inlet of the other terminal zone in the series to thereby provide cyclic fluid flow in said process;

washing the bed of a second zone previously exposed to said fluid mixture and located immediately downstream of said first zone with a washing fluid predominating in the non-selectively sorbable component of the desorbing fluid and substantially simultaneously withdrawing a raffinate mixture;

separating the raffinate mixture into a first fraction comprising non-selectively sorbable component of the fluid mixture, a second fraction comprising selectively sorbable component of the desorbing fluid and a third fraction consisting essentially of non-selectively sorbable component of the desorbing fluid;

returning the second fraction comprising selectively sorbable component of the desorbing fluid to said fixed bed by substantially simultaneously introducing said second fraction into a third zone immediately downstream of said second zone;

treating the washed bed of a fourth zone located immediately downstream of said third zone with the desorbing fluid and substantially simultaneously withdrawing a sorbate mixture;

separating the sorbate mixture into a fourth fraction comprising selectively sorbable component of the fluid mixture and a fifth fraction comprising selectively sorbable component and non-selectively sorbable component of the desorbing fluid;

returning the fifth fraction to the fixed bed by substantially simultaneously introducing said fifth fraction into the third zone as additional desorbing fluid;

returning the third fraction to the fixed bed by substantially simultaneously introducing said third fraction into a fifth zone located downstream of the fourth zone and upstream of the first zone;

maintaining a continuously circulating stream of fluid flowing through the series of interconnected zones; and periodically advancing downstream the point in said fixed bed of introducing said fluid mixture while simultaneously and equally advancing downstream the point of introducing desorbing fluid and third fraction and of withdrawing raffinate and sorbate.

6. The process of claim 5 further characterized in that the sorbent comprises a crystalline aluminosilicate having pore entrance openings of about 5 Angstroms and the selectively sorbable component comprises a straight chain aliphatic hydrocarbon.

7. A process for the separation of components of a fluid mixture at least one of which is selectively sorbed by contact with a bed of solid sorbent particles in which a desorbing fluid containing a selectively sorbable component and a non-selectively sorbable component is employed which comprises:

introducing the fluid mixture into contact with a bed of solid sorbent particles to sorb the selectively sorbable component thereof;

washing said bed with a wash fluid predominating in the non-selectively sorbable component of the desorbing fluid and withdrawing a raffinate mixture from said bed;

separating the raffinate mixture into a first fraction comprising selectively sorbable and non-selectively sorbable components of the desorbing fluid and a second fraction comprising non-selectively sorbable component of the fluid mixture;

treating said washed bed with the desorbing fluid and withdrawing a sorbate mixture from said bed;

separating the sorbate mixture into a third fraction comprising selectively sorbable component of the fluid mixture and a fourth fraction comprising selectively sorbable component of the fluid mixture and a fourth fraction comprising selectively sorbable and non-selectively sorbable components of the desorbing fluid;

commingling the first and fourth fractions to produce a fifth fraction;

separating the fifth fraction into a sixth fraction consisting essentially of non-selectively sorbable component of the desorbing fluid and a seventh fraction comprising selectively sorbable and non-selectively sorbable components of the desorbing fluid;

introducing the sixth fraction into contact with the bed to wash non-selectively sorbable component of the fluid mixture from interstitial void space between sorbent particles; and introducing the seventh fraction into contact with the bed to desorb the selectively sorbable component of the fluid mixture.

8. The process of claim 7 further characterized in that the sorbent comprises a crystalline aluminosilicate having pore entrance openings of about 5 Angstroms and the selectively sorbable component comprises a straight chain aliphatic hydrocarbon.

9. A process for the separation of components of a fluid mixture, at least one of which is selectively sorbed by contact with a solid sorbent in which a desorbing fluid containing a selectively sorbable component and a non-selectively sorbable component is employed to desorb the selectively sorbable component of the fluid mixture from the sorbent which comprises:

introducing the fluid mixture into contact with a bed of solid sorbent particles to sorb the selectively sorbable component thereof;

washing the bed with a wash fluid predominating in the non-selectively sorbable component of the desorbing fluid and withdrawing a raffinate mixture from said bed;

introducing the raffinate mixture into a fractional distillation column;

recovering a first fraction from said column comprising selectively sorbable and non-selectively sorbable components of the desorbing fluid;

recovering a second fraction from said column comprising non-selectively sorbable component of the fluid mixture;

recovering a third fraction from said column having a higher concentration of non-selectively sorbable component of the desorbing fluid than said first fraction;

treating said washed bed with the desorbing fluid and withdrawing a sorbate mixture from the bed;

separating the sorbate mixture into a fourth fraction comprising selectively sorbable component of the fluid mixture and a fifth fraction comprising selectively sorbable and non-selectively sorbable components of the desorbing fluid;

returning the third fraction to said bed to wash non-selectively sorbable component of the fluid mixture from interstitial void space between sorbent particles; and returning the first fraction and the fifth fractions to the bed to desorb the selectively sorbable component of the fluid mixture.

10. The process of claim 9 further characterized in that the sorbent comprises a crystalline aluminosilicate having pore entrance openings of about 5 Angstroms and the selectively sorbable component comprises a straight chain aliphatic hydrocarbon.

11. A process for the separation of components of a fluid mixture, at least one of which is selectively sorbed by contact with a solid sorbent in which a desorbing fluid containing a selectively sorbable component and a non-selectively sorbable component is employed to desorb the selectively sorbable component of the fluid mixture from the sorbent which comprises:

introducing the fluid mixture into contact with a bed of solid sorbent particles to sorb the selectively sorbable component thereof;

washing the bed with a washing fluid predominating in the non-selectively sorbable component of the desorbing fluid and withdrawing a raffinate mixture from said bed;

separating the raffinate mixture into a first fraction comprising selectively sorbable and non-selectively sorbable components of the desorbing fluid and a second fraction comprising non-selectively sorbable component of the fluid mixture;

treating the washed bed with the desorbing fluid and withdrawing a sorbate mixture from said bed;

separating the sorbate mixture into a third fraction comprising selectively sorbable component of the fluid mixture; a fourth fraction comprising selectively sorbable component of the desorbing fluid and a fifth fraction consisting essentially of non-selectively sorbable component of the desorbing fluid;

introducing the fifth fraction into contact with the bed to wash non-selectively sorbable component of the fluid mixture from interstitial void space between the sorbent particles; and introducing the first fraction and the fourth fraction to the bed to desorb the selecively sorbable component of the fluid mixture.

References Cited

UNITED STATES PATENTS

| | | | |
|---|---|---|---|
| 2,646,451 | 7/1953 | Rommel | 208—310 |
| 3,054,838 | 9/1962 | Egan | 208—310 |
| 2,935,467 | 5/1960 | Fleck et al. | 208—310 |
| 3,205,166 | 9/1965 | Ludlow et al. | 208—310 |
| 3,239,455 | 3/1966 | Lickus et al. | 208—310 |
| 3,274,099 | 9/1966 | Broughton | 208—310 |
| 3,392,113 | 7/1968 | De Rosset | 208—310 |

HERBERT LEVINE, Primary Examiner

U.S. Cl. X.R.

55—75; 210—263; 260—676, 708